S. K. DENNIS.
CLAMPING DEVICE.
APPLICATION FILED APR. 6, 1914.
1,192,996.
Patented Aug. 1, 1916.
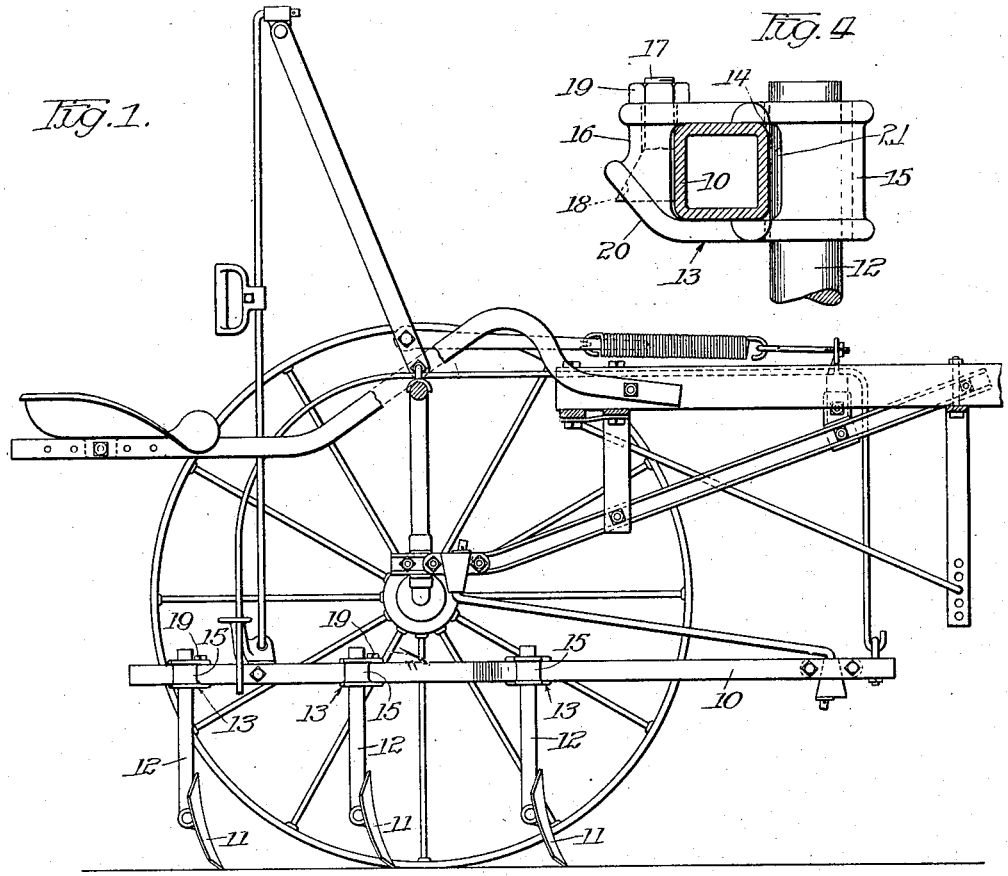

UNITED STATES PATENT OFFICE.

SAMUEL K. DENNIS, OF CHICAGO, ILLINOIS, ASSIGNOR TO INTERNATIONAL HARVESTER CORPORATION, A CORPORATION OF NEW JERSEY.

CLAMPING DEVICE.

1,192,996.  Specification of Letters Patent.  Patented Aug. 1, 1916.

Application filed April 6, 1914. Serial No. 829,845.

*To all whom it may concern:*

Be it known that I, SAMUEL K. DENNIS, a citizen of the United States, residing at Chicago, in the county of Cook and State of Illinois, have invented certain new and useful Improvements in Clamping Devices, of which the following is a full, clear, and exact specification.

My invention relates to clamping devices for use in cultivators.

It is desirable in cultivators that means be provided for permitting adjustment of the shovel shanks in a vertical direction and also horizontally along the beam. Simple forms of clamps are usually employed for connecting the shanks to the beam, and these afford means for vertical adjustment when loosened; but in order to move the shanks longitudinally, it becomes necessary to provide openings at intervals in the beam, thus impairing the strength of that member. Moreover, in the use of such expedients, to make an adjustment it is necessary to remove two nuts, and then in transferring the clamp it often happens that the holes are not located where desired and the proper adjustment of the shovel must then be abandoned. In other cases compound clamps are employed; that is, clamps which surround both the beam and shank, holding them in fixed position through frictional engagement, but in these forms heretofore a screw threaded bolt seated in the wall of the clamp adjacent the beam has been employed for locking the parts in adjusted position. Many objections have been raised against the employment of such locking means, chief among which may be mentioned the mutilation of the beam caused by the pointed ends of the bolts pressing forcibly thereon, it being understood that cultivator beams are generally tubular, and hence closely centered weight, such as that thrown on by the small end of a bolt, is prolific of dire results to the thin walls of the beam. There is also a further objection; namely, that, owing to the necessity for tightly screwing the bolt in place in order to secure a sufficient locking of the parts, the threads both on the bolt and on its seat in the wall of the clamp become quickly worn, necessitating complete replacement of the entire clamping device, unless the operator should happen to be one of the few in his class to have access to the necessary taps and dies for cutting new threads.

My object, therefore, is to overcome these objections in clamping devices and to provide improved means capable of a durable and inexpensive construction particularly adapted for use in attaching shovel shanks to cultivator beams, whereby a two-fold adjustable movement of the shovel shanks may be readily and easily obtained and in which danger of defacing or mutilating any of the parts of the clamp or beam on which it is mounted is entirely overcome. This object I accomplish by means of a novel form of clamping member arranged on the cultivator beam and shovel shank in a manner to permit both vertical and horizontal adjustment of the shank and provided with improved locking means in the form of a single wedge-shaped bolt presenting a flat longitudinal surface against the wall of the beam on which the clamp is employed.

One form which my invention may assume is exemplified in the following description and illustrated in the accompanying drawing, in which—

Figure 1 shows a vertical central sectional view of a complete cultivator embodying my invention; Fig. 2 shows a plan view of a clamping device attached to a cultivator beam and built in accordance with my invention; Fig. 3 shows a sectional view taken on the line 3—3 of Fig. 2; and Fig. 4 shows a cross sectional view of one of the beams with an embodiment of my improved clamping device mounted thereon and shown in elevation.

Referring in detail to the drawing it will be seen that I have illustrated one form of my device in connection with a cultivator of well-known construction having beams 10, shovels 11 and shovel shanks 12. The clamping device shown herein is employed between the shovel shank and beam and comprises a body portion 13 having formed therein a central opening 14 slightly longer in a horizontal direction than the width of the beam on which it is mounted. A side wall 15 of the clamp projects outwardly beyond the beam and is provided with an elongated tapered opening 15ᵃ to receive a shovel shank, which shank, when in place, frictionally engages the side of the beam and is held positively against movement by the force of the walls 15 in engagement therewith. The opposite side 16 of the clamp projects also and has formed within an opening to receive a bolt 17. The inner wall of the side 16 is shown beveled at 18, and the bolt 17 is provided with a beveled head, substantially wedge-shaped in appearance, to coact with said beveled surface 18. The bolt, when in position, engages at one side with a wall of the beam, and here it is preferably made flat in order to provide for a general distribution of its weight. A nut 19 is provided for the bolt, located preferably on the upper surface of the clamp and, obviously, by tightening this sufficiently the entire clamp 13 will be moved to position where the shank 12 is held, through frictional engagement, securely against vertical movement and the clamp likewise will be held against bodily movement on the beam. When, however, it is desired to adjust the shovels to a different position, it is only necessary for the operator to loosen the nut 19, whereupon the clamp will release the shovel shank and itself become loose upon the beam. The shank may then be moved in a vertical direction, or, by moving the clamp bodily along the beam, a horizontal adjustment of the accompanying shovel will be obtained. In order to distribute the strain on the beam 10 evenly, I have beveled the outer lower corner of the clamp, as shown at 20, which obviously permits the wedge-shaped bolt to occupy a position near the central portion of the beam, thus taking the weight from the corner thereof where it otherwise would be thrown.

From the foregoing it will be seen that I have successfully overcome the objections urged against other clamps heretofore employed for this purpose. It will be noted that the strain on the beam 10 is distributed over a comparatively large area by the bolt 17 and that there is, therefore, small danger of bending its wall. The location of the nut 19 on the top of the clamp clearly offers itself to easy accessibility by the operator when making an adjustment. Contrary to the mode of operation in other devices of this class, the bolt 17 is not tightened directly against the beam and, therefore, the strain on the threads is considerably relieved. If, however, the threads should become worn on the bolt or its nut, a new part can be readily substituted at small expense, as in practice the bolt will be of a shape and size commonly found in the stock of dealers in such parts. The clamp itself obviously will not be impaired by any injury to the bolt. A further advantage peculiar to this form of clamp is that it may be adjusted to take shovel shanks or beams of varying sizes, and for this purpose it will be noted that I have provided in the walls thereof cutaway portions 21 which will permit the reception of a larger beam than the one employed in the present instance. The tapered form of the opening 15$^a$ obviously allows for a wide variation in the size of the shovel standard and insures always a secure engagement thereof. The long beveled surfaces 18 on the wall of the clamp and on the head of the bolt will lend themselves to the comparatively wide adjustment necessary when shanks of different sizes are inserted in the clamp.

While I have shown and described but one form of my device, it will be understood, nevertheless, that it is susceptible of some modification and, therefore, changes may be made in many minor details without departing from the spirit of my invention as disclosed in the appended claims.

What I claim as my invention, and desire to secure by Letters Patent, is:

1. A clamping device for a cultivating member capable of permitting a two-fold adjustment thereof, having a beveled outer corner, a bolt having a wedge shaped portion lying adjacent to said beveled corner, with its oblique side turned outwardly, for adjustably locking the parts in fixed position on a support.

2. A clamping device for a cultivator member capable of permitting a two-fold movement thereof having a beveled outer corner and a beveled inner wall, and means associated with said clamping device for locking said member in adjusted position and adapted to coact with said beveled inner wall.

3. In a cultivator, a beam, a shovel shank, a clamp surrounding said beam and shank and capable of permitting a two-fold movement of said shank, said clamp being provided with a beveled outer corner, and a wedge-shaped bolt interposed between said beam and clamp adjacent to the beveled outer corner thereof for locking said shank in adjusted position.

In testimony whereof I affix my signature in the presence of two witnesses.

SAMUEL K. DENNIS.

Witnesses:
EVAN EVANS,
C. H. MANGOLD.

Copies of this patent may be obtained for five cents each, by addressing the "Commissioner of Patents, Washington, D. C."